G. W. ROBERTS.
WINDMILL GEARING.
APPLICATION FILED JAN. 27, 1919.
1,336,758.
Patented Apr. 13, 1920.
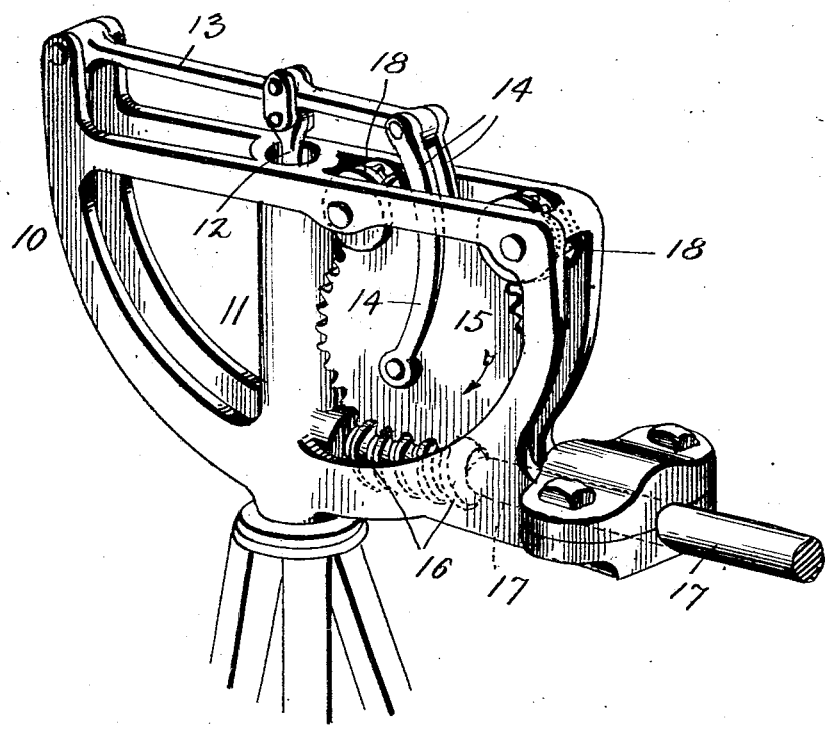
Inventor
George W. Roberts
by Chas. J. Williamson
Attorney

UNITED STATES PATENT OFFICE.

GEORGE W. ROBERTS, OF MENARD, TEXAS.

WINDMILL-GEARING.

1,336,758.  Specification of Letters Patent.  Patented Apr. 13, 1920.

Application filed January 27, 1919. Serial No. 273,352.

*To all whom it may concern:*

Be it known that I, GEORGE W. ROBERTS, a citizen of the United States, and resident of Menard, in the county of Menard, State of Texas, have invented a new and useful Improvement in Windmill-Gearing, of which the following is a specification.

The object of my invention is to provide gearing between the windwheel shaft and the pump rod which will utilize to the best possible advantage the power applied to the windwheel, will minify the strains from the load, will most efficiently take care of such strains as are unavoidable, and will be of simple and wear resisting construction and to this end my invention consists in the windmill gearing, substantially as hereinafter specified and claimed.

In the annexed drawing the figure is a perspective view of a windmill gearing embodying my invention.

In making my invention I have utilized much of the mechanism of my Patent No. 1,012,916, dated December 26, 1911, and, as in that patent I employ a frame work 10, which, as shown, is carried by the usual turn table supported at the top of the wind mill tower. Said frame work comprises a pair of spaced semi-circular members and straight horizontal members connecting the semi-circular members, said parts being secured to a tubular upright 11 that rises from the turntable and through which passes the plunger or piston rod 12, which plunger or rod is pivotally connected to a lever 13 that is pivoted at one end to the top of the frame work 10 at one side thereof, and at its other end is pivotally connected to the upper end of a pitman 14 which is of split or bifurcated form and straddles a gear wheel 15 to which the pitman is pivotally connected eccentrically at opposite sides of said gear wheel, so that there is a direct and balanced connection between the gear wheel 15 and lever 13, which results in the subjection of the parts to strains only in direct lines with no sidewise or oblique tendency, and hence, such parts as the pitman 14, the lever 13 and the pump rod or plunger 12, have no oblique strains thereon.

At its bottom, the wheel 15, (which is a worm wheel), rests upon and is in mesh with a worm or screw 16 on a horizontal shaft 17 upon which the wind wheel (not shown) is mounted, and to support said wheel against upward as well as edgewise thrust in either direction, I engage it, at several points above its axis, with rolling supports in the form of pinions or toothed wheels 18 mounted to revolve on pivots in the frame 10. The direction of inclination of the worm thread is such as to make the thrust or reaction of the teeth of the worm wheel oppose the endwise thrust on the windwheel shaft from the pressure of the wind on the wind wheel; and it will be seen that I eliminate sidewise pressure on the worm wheel with consequent strain and loss of power, such as is unavoidable with the wind wheel shaft arranged as shown in the drawing of my aforesaid patent.

No shaft for the worm wheel is employed for it rests upon and is supported by the worm or screw, and it is retained from sidewise motion by the straddling pitman 14 and flanges on the rollers or pinions.

I claim:—

1. In windmill gearing, the combination of a horizontal wind wheel shaft, a worm thereon, a worm wheel resting upon and meshing with the worm, bearings engaging the periphery of the wheel above its axis of revolution, a part to be operated, and means to transmit motion to said part from said wheel.

2. In windmill gearing, the combination of a horizontal windwheel shaft, a worm thereon, a worm wheel resting upon and meshing with said worm, rollers engaging the periphery of the wheel above its axis of revolution, a pitman connected with the wheel, straddling the same, and means to utilize the motion of the pitman.

In testimony whereof I affix my signature.

GEORGE W. ROBERTS.